United States Patent
Freitag et al.

(10) Patent No.: US 6,624,985 B1
(45) Date of Patent: Sep. 23, 2003

(54) PINNING LAYER SEEDS FOR CPP GEOMETRY SPIN VALVE SENSORS

(75) Inventors: James Mac Freitag, San Jose, CA (US); Mustafa Pinarbasi, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/040,613

(22) Filed: Jan. 7, 2002

(65) Prior Publication Data (65)

(51) Int. Cl.[7] .................................................. G11B 5/39
(52) U.S. Cl. .................................................. 360/324.1
(58) Field of Search ........................ 360/324.1, 324.11, 360/324.12, 324.2

(56) References Cited

U.S. PATENT DOCUMENTS

| | | | |
|---|---|---|---|
| 5,574,605 A | * 11/1996 | Baumgart et al. | ..... 360/324.11 |
| 5,627,704 A | 5/1997 | Lederman et al. | |
| 5,668,688 A | 9/1997 | Dykes et al. | |
| 6,046,892 A | * 4/2000 | Aoshima et al. | ........ 360/324.11 |
| 6,134,089 A | 10/2000 | Barr et al. | .................... 360/322 |
| 6,201,671 B1 | 3/2001 | Pinarbasi | ............... 360/324.11 |
| 6,313,973 B1 | * 11/2001 | Fuke et al. | .............. 360/324.1 |
| 6,317,299 B1 | 11/2001 | Pinarbasi | ............... 360/324.11 |
| 6,396,671 B1 | * 5/2002 | Horng et al. | ............ 360/324.1 |
| 6,404,606 B1 | * 6/2002 | Pinarbasi | ............... 360/324.11 |
| 6,452,763 B1 | * 9/2002 | Gill | ....................... 360/324.11 |
| 6,490,140 B1 | * 12/2002 | Mao et al. | ............. 360/324.11 |
| 6,504,688 B2 | * 1/2003 | Hasegawa et al. | ..... 360/324.11 |
| 6,519,120 B1 | * 2/2003 | Lee et al. | ................ 360/324.1 |
| 6,522,507 B1 | * 2/2003 | Horng et al. | .......... 360/324.12 |

* cited by examiner

Primary Examiner—David L. Ometz
(74) Attorney, Agent, or Firm—Walter W. Duft (57) ABSTRACT

A CPP geometry spin valve sensor for sensing magnetically recorded information on a data storage medium includes an electrically conductive, multilevel seed layer that interfacially engages a pinning layer of the sensor and increases the sensor's magnetoresistance while maintaining acceptable values of free layer coercivity, pinned-free layer magnetic coupling and free layer magnetostriction.

24 Claims, 6 Drawing Sheets

PINNING LAYER SEEDS FOR CPP GEOMETRY SPIN VALVE SENSORS

BACKGROUND OF THE INVENTION

1. Field of the Invention

The present invention relates to magnetoresistive sensors for reading magnetically-recorded information from data storage media, and particularly to CPP (Current-Perpendicular-to-Plane) spin valve read sensors for direct access storage device (DASD) systems.

2. Description of the Prior Art

By way of background, magnetoresistive spin valve sensors have been proposed for use as magnetic field sensors (e.g., read head sensors) in DASD systems, such as disk drives. A spin valve sensor is a variable current device formed by a magnetically pinned ferromagnetic layer and a magnetically free ferromagnetic layer separated by an electrically conductive spacer layer. An antiferromagnetic pinning layer is used to exchange-bias the pinned layer so that its magnetic moment is pinned 90° to an air bearing surface (ABS) of the sensor that magnetically interfaces with an opposing magnetic storage medium during drive operation.

The magnetic moment of the free layer is free to rotate in positive and negative directions from a zero bias point position in response to positive and negative magnetic domains recorded on the magnetic storage medium. The zero bias position is the position of the magnetic moment of the free layer when the sensor is in a quiescent state and no external magnetic fields are present. The magnetic moment of the free layer when the sensor is in its quiescent state is preferably perpendicular to the magnetic moment of the pinned layer and parallel to the ABS. This allows for read signal asymmetry upon the occurrence of positive and negative magnetic field incursions of a rotating disk.

Electrical leads and/or shields are positioned to make electrical contact with the ferromagnetic layers. In a CIP (Current-In-Plane) spin valve sensor, the leads are arranged so that electrical current passes through the sensor in a direction that is parallel to the plane of the pinned and free layers. In a CPP sensor, the leads are arranged to induce a sense current that passes perpendicularly through the spacer layer from the pinned ferromagnetic layer to the free layer. In either case, when the sense current passes through the sensor, a readback signal is generated which is a function of the resistance changes that result when the magnetic moment of the free layer rotates relative to the pinned layer magnetic moment under the influence of recorded magnetic domains. Resistance is lower when the relative magnetic moments are parallel and higher when the magnetic moments are antiparallel.

Because of their superior sensitivity and higher magnetoresistance ($\Delta R/R$), CPP spin valves are generally preferred over CIP spin valves for future products. High magnetoresistance equates to increased sensitivity of the spin valve sensor to magnetic flux incursions from the rotating storage medium. Other parameters that affect performance are the coupling field ($H_e$) between the pinned layer and the free layer across the spacer layer, the coercivity ($H_c$) of the free layer, and the free layer's magnetostriction ($\lambda$). It is desirable to minimize the coupling field $H_e$ insofar as this parameter affects the bias point and sensitivity of the sensor. Ideally, the value the coupling field He is negative. It is also preferable that the coercivity parameter $H_c$ be as low as possible. The magnetostriction value $\lambda$ is preferably a negative number.

Commonly assigned U.S. Pat. No. 6,317,299 of M. Pinarbasi (one of the co-inventors named herein), discloses a pining layer seed for increasing the magnetoresistance of a CIP spin valve sensor having a PtMn (platinum manganese) antiferromagnetic pinning layer. The preferred seed layer of the '299 patent comprises a first seed layer of CoFeB (cobalt iron boron), a second seed layer of NiMnO (nickel manganese oxide) and a third seed layer of $Al_2O_3$ (aluminum oxide). U.S. Pat. No. 6,201,671 of M. Pinarbasi similarly discloses a pinning layer seed for increasing the magnetoresistance of a CIP spin valve sensor having an antiferromagnetic pinning layer formed from NiO (nickel oxide). The preferred seed layer of the '671 patent comprises a metal oxide, such as $Ta_yO_x$ (tantalum oxide).

While it would be desirable to take advantage of the pinning seed layers of the '299 and '671 patents in a CPP sensor, the use of an oxide seed layer in a CPP configuration is precluded because it would block the sense current.

Accordingly, a need exists for a CPP sensor configuration that increases magnetoresistance in similar fashion to the oxide pinning layer of the '299 and '671 patents, but without the incompatibility of such oxides relative to perpendicular-to-plane current flow. What is required in particular is a pinning layer that is electrically conductive relative to an applied CPP sensing signal and which provides desired magnetoresistance-enhancing properties.

SUMMARY OF THE INVENTION

The foregoing problems are solved and an advance in the art is obtained by a novel CPP geometry spin valve sensor for sensing magnetically recorded information on a data storage medium. The sensor includes an electrically conductive, multilevel seed layer that interfacially engages an antiferromagnetic pinning layer of the sensor and increases the sensor's magnetoresistance while maintaining acceptable values of 1) the coercivity ($H_c$) of the ferromagnetic free layer of the sensor, 2) the magnetic coupling field ($H_e$) between the sensor's ferromagnetic pinned layer and the free layer, and 3) the free layer's magnetostriction ($\lambda$).

The seed layer preferably comprises a first Ru/Si seed layer portion formed by alternating sub-layers of ruthenium (Ru) and silicon (Si), and a second NiFeCr seed layer portion. The Ru/Si seed layer portion can be applied on a bottom lead or shield of the sensor, preferably using ion beam deposition. The Ru/Si seed layer portion may have a total thickness ranging between about 10–50 Å. The Ru and Si sub-layers are applied in alternating fashion, preferably beginning with an Si sub-layer. In exemplary configurations, the Ru/Si seed layer portion comprises three Si layers and two Ru layers that are each about 6–8 Å thick. The NiFeCr seed layer portion is formed over the Ru/Si seed layer portion such that it interfacially engages the Ru/Si seed layer portion and an overlying PtMn antiferromagnetic pinning layer. The PtMn antiferromagnetic layer itself interfacially engages the sensor's ferromagnetic pinned layer(s).

The invention further contemplates an integrated read/write head and a disk drive that respectively include a spin valve sensor as summarized above.

BRIEF DESCRIPTION OF THE DRAWING

The foregoing and other features and advantages of the invention will be apparent from the following more particular description of preferred embodiments of the invention, as illustrated in the accompanying Drawing, in which.

DETAILED DESCRIPTION OF PREFERRED EMBODIMENTS

Figure 1:
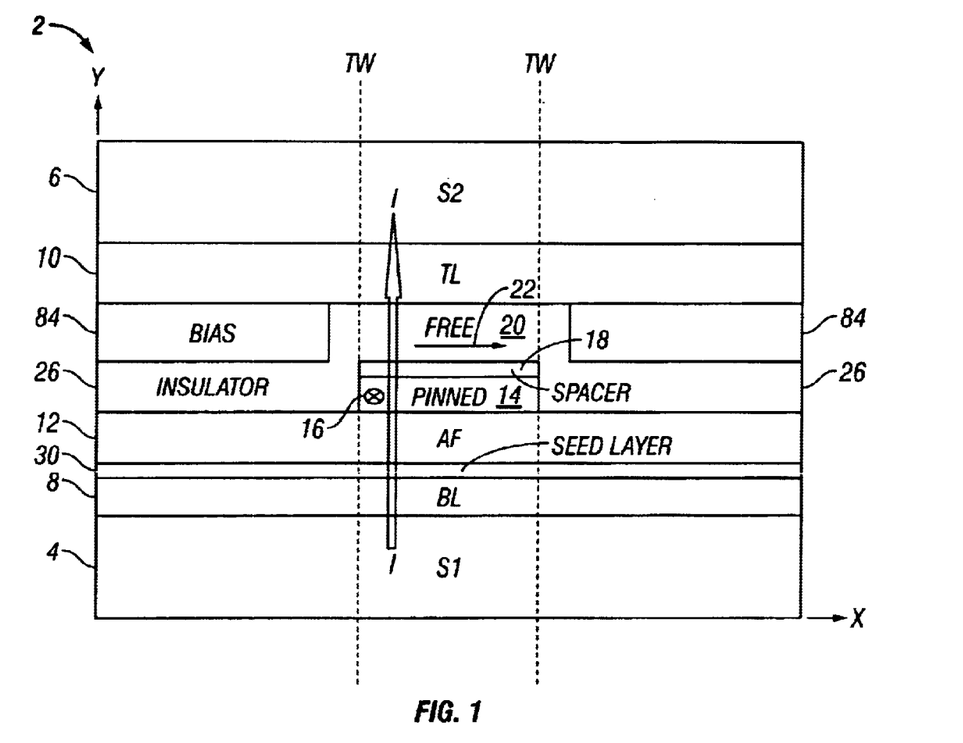
FIG. 1 is a diagrammatic ABS view of a spin valve read sensor constructed in accordance with the present invention.

Turning now to the figures, wherein like reference numerals represent like elements in all of the several views, FIG. 1 shows a CPP spin valve sensor 2 that is constructed in accordance with the invention. The view of FIG. 1 is taken on a plane that is parallel to the Air Bearing Surface (ABS) of the sensor 2, which is adapted for use in a disk drive such that the sensor flies over an adjacent magnetic recording disk during operation. Note that the illustrated components of the sensor 2 will not necessarily be visible from the ABS (Air Bearing Surface) insofar as the sensor may be recessed from the ABS and magnetically connected thereto by way of a flux guide (not shown). The "x" axis in FIG. 1 represents the radial track width direction of a concentric track on the underlying disk. The "y" axis in FIG. 1 represents the circumferential centerline direction of a concentric track on the disk. The "z" axis represents the direction pointing perpendicularly into the disk surface.

It will be seen in FIG. 1 that the sensor 2 has multiple materials layers. These layers and their functions will now be generally described. At the bottom of the sensor 2 is an S1 shield layer 4 and at the top of the sensor 2 is an S2 shield layer 6. The shield layers 4 and 6 are conventionally formed as a suitably thick deposit of electrically conductive ferromagnetic material, such as Ni—Fe (permalloy), Ni—Fe—Co, Sendust, a cobalt-zirconium-niobium alloy, etc. The purpose of the shield layers 4 and 6 is to magnetically isolate the sensor 2 in the event it is integrated with other components, such as an inductive write transducer. Note that the S2 shield layer 6 may also form a P2 pole layer of the write transducer if the sensor 2 is part of an integrated read/write head. In some cases, the shield layers 4 and 6, which are typically electrically conductive, may be used to deliver a sense current to the sensor 2. In other cases, dedicated electrical leads may be provided. Thus, as shown in FIG. 1, a bottom electrical lead layer 8 may be formed adjacent to the S1 shield layer 4, and a top electrical lead layer 10 may be formed adjacent to the S2 shield layer(/P2 pole layer) 6. The electrical leads 8 and 10 can be formed by ~100 Å layers of Cu, Au, Pt or other suitable conductive material.

Sandwiched between the bottom lead layer 8 and the top lead layer 10 in FIG. 1, and located within a pair of track width boundaries TW, are the layers that define the CPP spin valve portion of the sensor 2. In particular, there is disposed over the bottom lead layer 8 an antiferromagnetic layer 12 that exchange-biases an overlying ferromagnetic layer 14, making layer 14 the pinned layer of the sensor 2. The antiferromagnetic layer 12 is deposited to a suitable thickness (e.g., about 100–150 Å) using Fe—Mn, Ni—Mn, Pt—Mn, IrMn, or other suitable antiferromagnetic material that is capable of exchange biasing the ferromagnetic material in the pinned layer 14.

According to conventional CPP design, the magnetization direction of the pinned layer 14 is sufficiently fixed by the exchange-biasing antiferromagnetic layer 12 to prevent rotation thereof in the presence of external magnetic fields, such as magnetic domains recorded on an adjacent disk. The magnetization direction of the pinned layer 14 (magnetic moment) points either into or out of the plane of FIG. 1, such that it is oriented generally perpendicular to the sensing surface of the sensor 2. The arrow tail 16 illustrates an exemplary configuration where the magnetization direction is into the plane of FIG. 1.

The pinned layer 14 can be implemented as a single layer having a single magnetic domain orientation, or as sequence of sub-layers having parallel and anti-parallel magnetic domain directions. The pinned layer 14 may thus be formed by growing one or more layers of Co, CoFe, Ni—Fe (permalloy) or other suitable ferromagnetic material on top of the antiferromagnetic layer 12 to a total thickness of about 10–80 Å. As stated, the pinned layer 14 will have its magnetic moment fixed by interfacial exchange coupling with the antiferromagnetic layer 12. In an alternative configuration, the pinned layer 14 can be comprised largely of a bulk $Ni_{(100-x)}Fe_{(x)}$ layer with a thin 10–20 Å layer of a Co or $Co_{(100-y)}Fe_{(y)}$ or $Ni_{(100-x)}Fe_{(x)}$ (x is approximately 20) material at the interface with a spacer layer 18 that lies over the pinned layer.

The spacer layer 18 is formed as a suitably thick layer of an electrically conductive, non-ferromagnetic material, such as Cu. Above the spacer layer 18 is another ferromagnetic layer that forms the sensor's free layer 20. The free layer 20 can be formed by covering the spacer layer 18 with Co, CoFe, Ni—Fe or other suitable ferromagnetic material. In an alternative configuration, the free layer 20 can be formed from a thin $Co_{(100-y)}Fe_{(y)}$, or $Ni_{(100-x)}Fe_{(x)}$ layer at the interface with the spacer layer 18, with the bulk of the free layer 20 being a low magnetostriction material, such as $Ni_{(100-x)}Fe_{(x)}$ (x is approximately 19). Note that the net magnetostriction of this type of free layer 20 is preferably arranged to have a negative value by making slight variations to the composition of the bulk of the partial free layer.

The arrow 22 in FIG. 1 shows the preferred magnetization direction (magnetic moment) of the free layer 20 when the sensor 2 is in a quiescent state with no magnetic field incursions from an adjacent magnetic disk. This magnetization direction, which is parallel to the plane of FIG. 1, is influenced by a pair of (hard) biasing layers 24 formed on either side of the free layer outside the track width boundaries TW. The biasing layers 24 are formed over corresponding insulator layers 26 that electrically isolate the biasing layers 24 from the spacer layer 18, the pinned layer 14, and the antiferromagnetic layer 12.

During operation of the sensor 2, an electrical sense current I is passed through the sensor in the direction of the large arrows shown in FIG. 1. When the sense current I passes through the sensor 2 and there are no positive or negative magnetic incursions imposed on the sensor from a rotating magnetic disk, the sensor is said to be in a quiescent state. In this state, the magnetic moment 22 of the free layer 20 will be oriented as shown in FIG. 1. When positive or negative magnetic incursions are introduced into the sensor, the magnetic moment 22 of the free layer 20 will rotate upwardly or downwardly out of the plane of FIG. 1 (i.e. toward or away from the reader). The in-plane magnetic moment position of FIG. 1 is generally the zero bias point on the transfer curve of the sensor 2.

If the magnetic moment 22 is positioned upwardly or downwardly from this zero bias position while the sensor 2 is in a quiescent state, the bias point of the sensor is not zero and instead will be some value positive or negative with respect to the zero bias position. When the magnetic moment 22 is in the zero bias position, the readback signal from the sensor 2 will have symmetry about the bias point, which is a desirable characteristic. When the magnetic moment 22 is angled upwardly or downwardly from the zero bias orientation, the read back signal is asymmetric, which is not desirable.

As stated by way of background above, there are various forces acting on the free layer magnetic moment when a spin valve sensor is in its quiescent state. These forces include the coupling field ($H_e$) between the pinned layer and the free layer across the spacer layer, the coercivity ($H_c$) of the free layer, and the free layer's magnetostriction ($\lambda$). It is desirable to minimize the negative coupling field $H_e$ insofar as this parameter affects the bias point and the sensitivity of the sensor. It is also preferable that the coercivity parameter $H_c$ be as low as possible. The magnetostriction value $\lambda$ is preferably a negative number.

In accordance with the invention, the magnetoresistance of the sensor 2, and thus its sensitivity, can be improved by providing an electrically conductive, multilevel seed layer 30 below the antiferromagnetic layer 12 and in interfacial engagement therewith. As described in more detail below, the seed layer 30 preferably includes a first seed layer portion comprising alternating multiple Ru/Si sub-layers, and a second seed layer portion comprising NiFeCr. Both of the first and second seed layer portions are deposited (preferably using ion beam deposition) between the bottom lead 8 and the antiferromagnetic layer 12. The Ru/Si seed layer portion is deposited first and comprises the alternating sub-layers of Ru and Si. The thickness of the Ru/Si seed layer portion may range from about 10–50 Å. The NiFeCr seed layer portion is deposited on top of the Ru/Si layer portion. Collectively, the Ru/Si seed layer portion and the NiFeCr seed layer portion promote smooth growth of the antiferromagnetic layer 12, making its microstructure more uniform from top to bottom and increasing overall sensor magnetoresistance.

Advantageously, the improvement in magnetoresistance provided by the seed layer 30 is achieved while maintaining acceptable values of $H_e$, $H_c$, and $\lambda$ within ranges of such parameters that are necessary for proper zero biasing of free layer magnetic moment. Note that in lieu of an Ru/Si first seed layer portion, other electrically conductive, multi-level seed layer materials may also offer similar benefits when used to promote the smooth growth of an overlying antiferromagnetic layer in accordance with the invention. Similarly, materials other than NiFeCr could potentially be used for the second seed layer portion.

Figure 2:
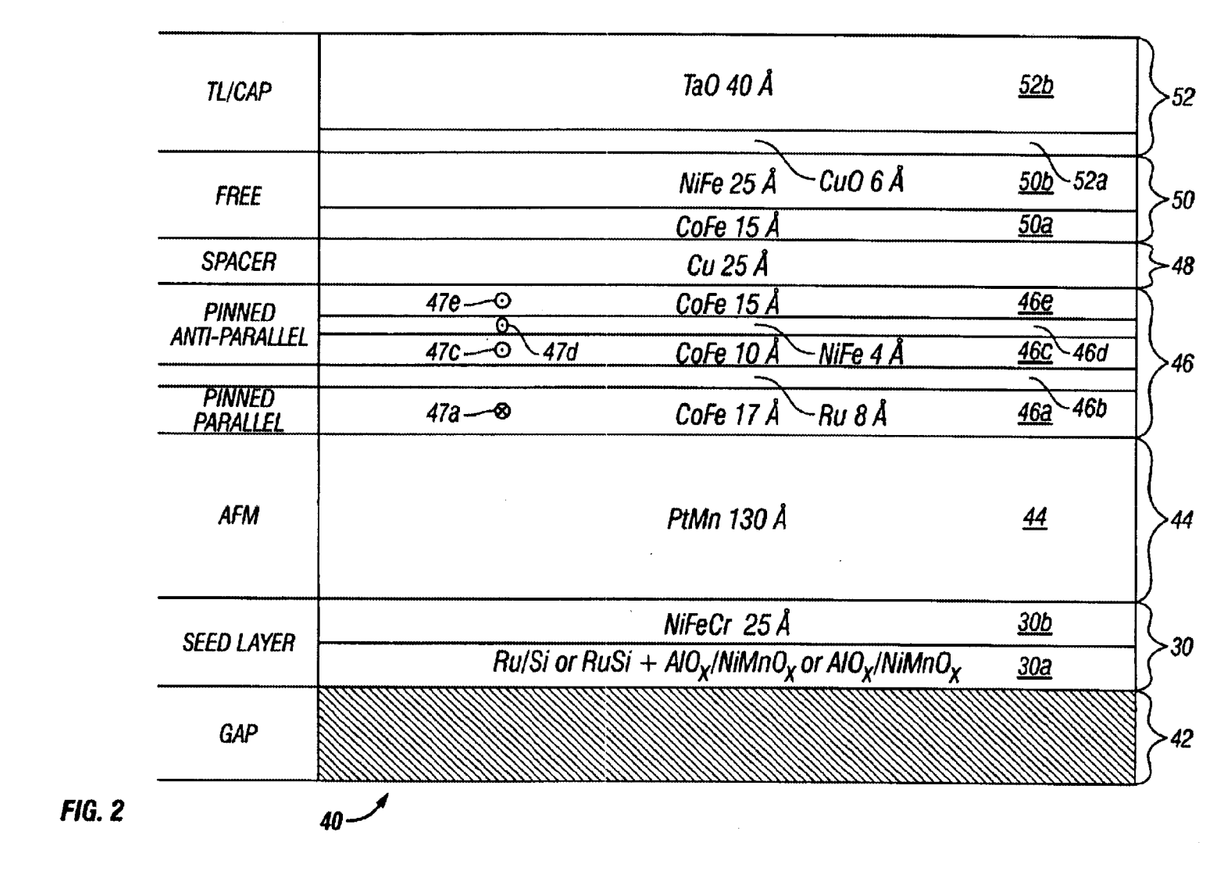
FIG. 2 is a more detailed diagrammatic ABS view of a read sensor of FIG. 1.

In order to demonstrate the effectiveness of the above-described seed layer 30 in a CPP sensor, such as the sensor 2 of FIG. 1, five CIP test sensors 40 were constructed according to the configuration shown in FIG. 2. The test sensors 40 were configured for CIP operation so that seed layer 30 could be compared against oxide seed layers of the type currently used to enhance magnetic performance in CIP spin valves. The five test sensors 40 were constructed with different seed layer configurations. Two sensors had a first seed layer portion 30a comprising only Ru/Si sub-layers. One sensor had a first seed layer portion 30a comprising only oxide sub-layers. The remaining sensors had a first seed layer portion 30a comprising both Ru/Si sub-layers and oxide sub-layers.

Figure 3:
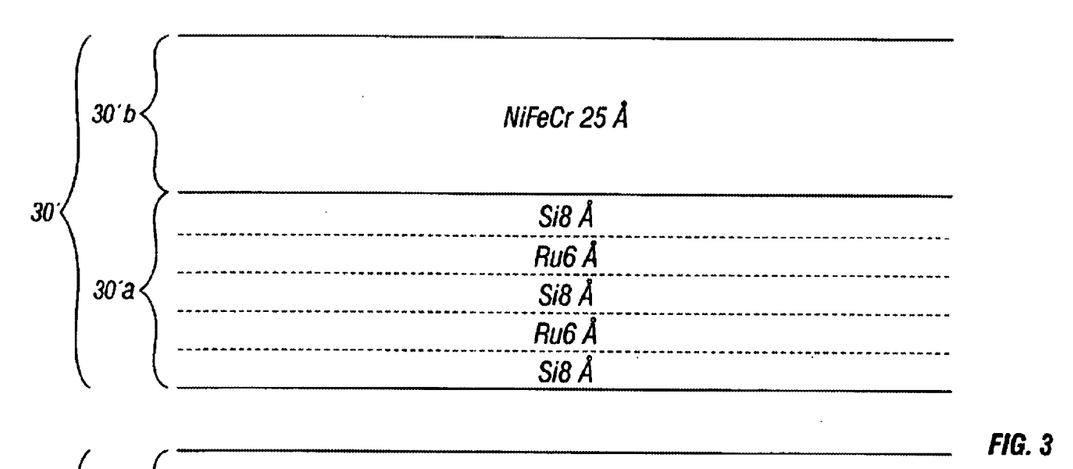
FIG. 3 is a detailed diagrammatic ABS view of a seed layer used in the read sensor of FIG. 1 according to one exemplary embodiment of the invention.
Figure 4:
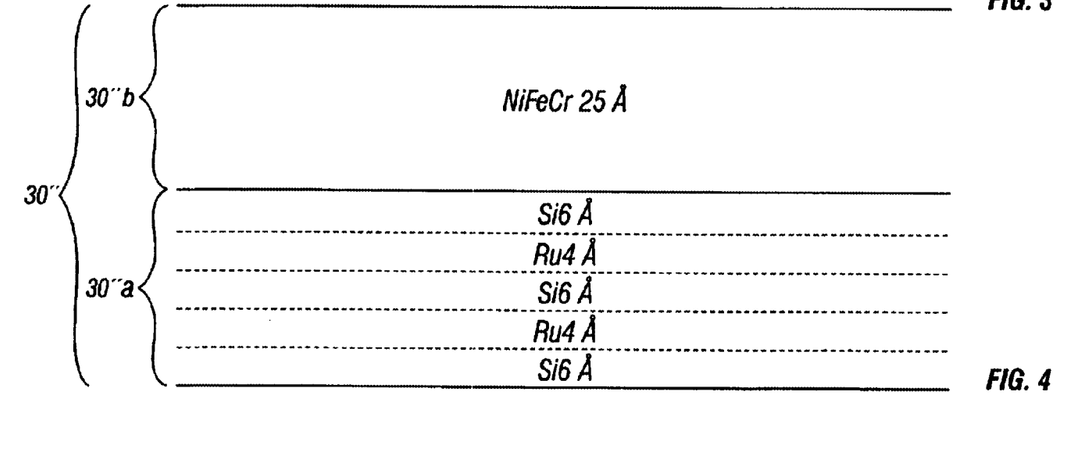
FIG. 4 is a detailed diagrammatic ABS view of a seed layer used in the read sensor of FIG. 1 according to another exemplary embodiment of the invention.

As shown in FIG. 2, each sensor 40 started with a conventional gap layer 42 comprising $AlO_3$. On top of the gap layer 42 was the first seed layer portion 30a. As stated, four of the sensors 40 had first seed layer portions 30a that comprised Ru/Si sub-layers. In two sensors, the Ru/Si sub-layers were 8 Å and 6 Å thick, respectively, while in the other two sensors having Ru/Si sub-layers, the Ru and Si layers were 6 Å and 4 Å thick, respectively. These seed layer configurations are respectively shown in FIGS. 3 and 4 and are respectively designated as 30' (see FIG. 3) and 30" (see FIG. 4). The seed layer configuration 30' of FIG. 3 includes a first Ru/Si seed layer portion 30'a in which there are two composite sub-layers each comprising an 8 Å Si sub-layer and a 6 Å Ru sub-layer. An 8 Å Si sub-layer then covers the two composite sub-layers. The seed layer configuration 30" of FIG. 4 includes a first Ru/Si seed layer portion 30a" in which there are two composite sub-layers each comprising a 6 Å Si sub-layer and a 4 Å Ru sub-layer. A 6 Å Si sub-layer then covers the two composite sub-layers.

Returning now to FIG. 2, the seed layers 30 of all of the sensors 40 included a NiFeCr second seed layer portion 30b that was applied over the first seed layer portion 30a at a thickness of 25 Å.

An antiferromagnetic layer 44 was formed over the seed layer 30 using conventional techniques. This layer was made from PtMn and was applied at a substantially greater thickness of 130 Å.

A pinned layer 46 was formed over the antiferromagnetic layer 44. The pinned layer 46 was configured as a so-called anti-parallel pinned layer in which a first portion of the pinned layer has magnetic domains that are anti-parallel to a second portion of the pinned layer. The pinned layer 46 of FIG. 2 thus comprises a parallel layer 46a that is made from CoFe and applied at a thickness of 17 Å. Its magnetic domain direction is shown by the arrow tail 47a. A thin separation layer 46b made from Ru was then applied at a thickness of about 8 Å. The anti-parallel pinned layers were formed on top of the separation layer 46b, and include a CoFe layer 46c having a thickness of about 10 Å, an NiFe layer 46d having a thickness of about 4 Å, and another CoFe layer 46e having a thickness of about 15 Å. The magnetic domain directions of the layers 46c, 46d and 46e are respectively shown by the arrowheads 47c, 47d and 47e.

A spacer layer 48 was formed over the pinned layer 46 as a 20 Å thick layer of Cu. A free layer 50 was applied over the spacer layer 48. The free layer 50 was formed as a CoFe bottom layer 50a having a thickness of about 15 Å and a NiFe top layer 50b having a thickness of about 25 Å. A cap layer 52 was formed over the free layer 50. It included a 6 Å layer 52a of Cu (or CuO) and a 40 Å layer 52b of $Ta_xO_y$.

Table 1 below shows the results of the testing conducted on the various sensors 40:

| OXIDE UNDERLAYER | Ru/Si MULTILAYER | $R_{sheet}$ ($\Omega$/sq.) | $\Delta R/R$ (%) | $H_e$ (Oe) | $H_c$ (Oe) | T (Å) | $\lambda$ |
|---|---|---|---|---|---|---|---|
| $AlO_x$ 30 Å/$NiMnO_x$ 30 Å | NONE | 22.5 | 8.93 | −20.2 | 3.2 | 37.8 | −8.33E − 07 |
| $AlO_x$ 30 Å/$NiMnO_x$ 30 Å | 2 × (Si 8 Å/Ru 6 Å) + Si 8 Å | 22.8 | 8.68 | −13.8 | 6.8 | 37.4 | −5.37E − 07 |
| NONE | 2 × (Si 8 Å/Ru 6 Å) + Si 8 Å | 22.3 | 8.57 | −14.2 | 7.0 | 39.1 | −5.99E − 07 |
| $AlO_x$ 30 Å/$NiMnO_x$ 30 Å | 2 × (Si 6 Å/Ru 4 Å) + Si 6 Å | 21.5 | 8.60 | −17.9 | 6.5 | 39.9 | −9.80E − 07 |
| NONE | 2 × (Si 6 Å/Ru 4 Å) + Si 6 Å | 21.6 | 8.82 | −17.6 | 6.4 | 41.0 | −5.59E − 07 |

Each sensor listed in Table 1 was tested for several physical properties; namely, sheet resistance (Rsheet), magnetoresistance ($\Delta R/R$), free layer coercivity ($H_c$), pinned-free layer magnetic coupling ($H_e$), and free layer magnetostriction ($\lambda$). Table 1 also shows the thickness T of the free layer 50 for each tested sensor 40.

Table 1 demonstrates that the magnetic characteristics of the tested sensors are substantially preserved when the oxide underlayers are omitted from the seed layer configurations. In particular, when comparing row 2 (oxide layers) to row 3 (no oxide layer) of Table 1, note that there is no significant loss of magnetoresistance ($\Delta R/R$) and no negative impact on the other measured magnetic characteristics. Similarly, when comparing row 4 (oxide layers) to row 5 (no oxide layers) of Table 1, there is a slight increase magnetoresistance ($\Delta R/R$) and again no negative impact on the other measured magnetic characteristics. Overall, the test results of Table 1 demonstrate the effectiveness of Ru/Si seed layer portions for improving magnetoresistance in spin valve sensors while preserving other important magnetic properties, namely, free layer coercivity ($H_c$), pinned-free layer magnetic coupling ($H_e$), and free layer magnetostriction ($\lambda$). Importantly, although the tested sensors 40 where configured for CIP operation, the results obtained from the use of Ru/Si seed layer portions can be expected to apply with equal force to CPP sensors, which apart from their electrical connections, are of essentially identical construction to CIP sensors. It is also reasonable to expect that other seed layer IV electrically conductive materials that are capable of promoting the smooth growth of an overlying ferromagnetic structure made from PtMn, or other conventional materials, will likewise be suitable for use in a CPP spin valve sensor in accordance with the invention.

Figure 5:
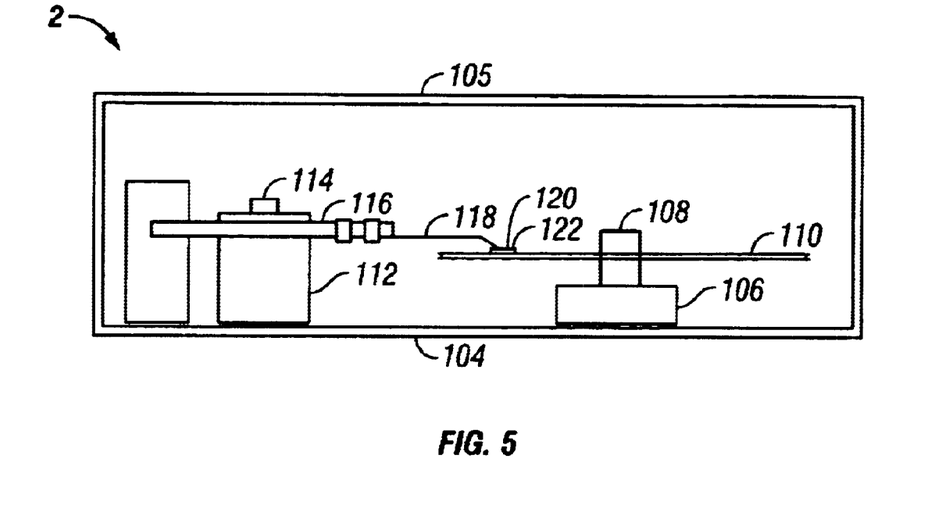
FIG. 5 is a simplified vertical sectional view of a magnetic disk drive that incorporates a magnetoresistive sensor according the present invention.
Figure 6:
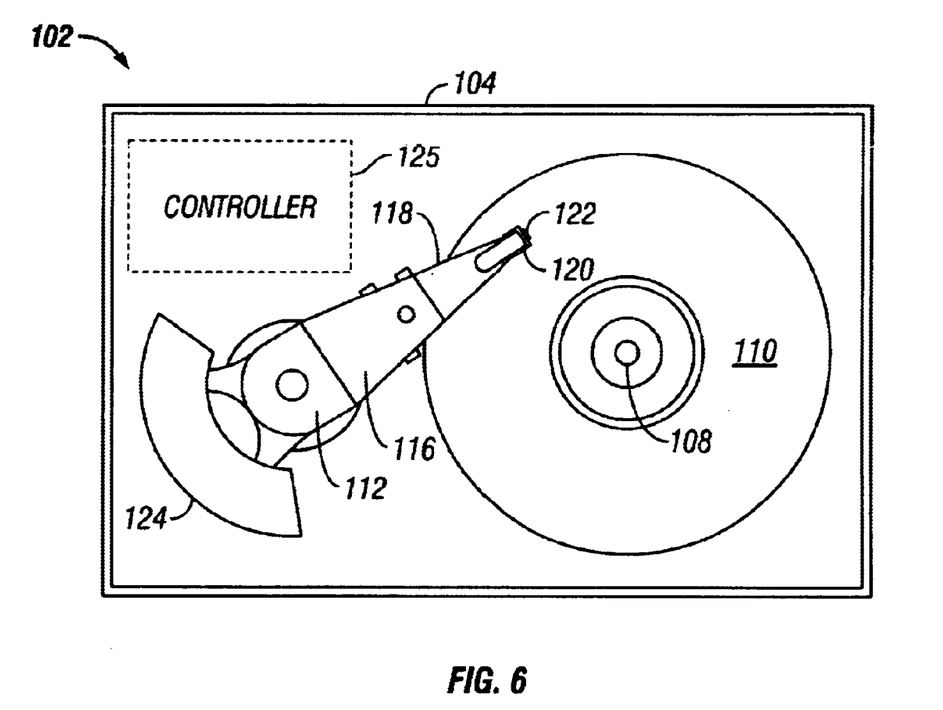
FIG. 6 is a simplified horizontal sectional view of the disk drive of FIG. 5.

Turning now to FIGS. 5 and 6 an exemplary disk drive 102 is shown that incorporates a CPP spin valve sensor having a seed layer constructed in accordance with the invention. Note that the disk drive 102 is shown in greatly simplified schematic form, with only those construction details that are necessary for an understanding of the invention being represented. As to these illustrated components, it should be understood that all are conventional in nature unless otherwise indicated below.

The disk drive 102 conventionally includes a base casting 104 made from aluminum or other suitable material. A cover 105 is removably mounted thereto via a hermetic seal (not shown). The base casting 104 supports a conventional spindle drive motor 106 having an associated drive spindle 108. The drive spindle 108 carries a disk 110 for high speed rotation therewith. Other disks (not shown) may also be carried on the drive spindle 108 to form a spaced vertically stacked disk platter arrangement. The disk 110 is made from a suitable material of a type usually found in magnetic disk drive assemblies. In particular, the disk 110 is formed from an aluminum or glass substrate with appropriate coatings being applied thereto such that at least one, and preferably both, of the upper and lower surfaces of the disk are magnetically encodable and aerodynamically configured for high speed interaction with a read/write transducer (described below).

Data access to the disk 110 is achieved with the aid of an actuator 112 that is mounted for rotation about a stationary pivot shaft 114. The actuator 112 includes a rigid actuator arm 116 that carries a flexible suspension 118. The suspension 118 in turn carries a slider 120 that mounts a transducer 122. The transducer 122 is an integrated device that includes a magnetic write head and a read head that may incorporate a conventional magnetoresistive sensor or the like. The actuator 112, which is conventionally driven by a voice coil motor 124, moves the slider 120 generally radially across the surface of the disk 110 so that the transducer 122 is able to trace concentric data tracks on the disk.

Data is recorded on the disk 110 by the write head portion of the transducer 122. Data is read from the disk 110 by the read head portion of the transducer 122. This data is processed into a readback signal by signal amplification and processing circuitry (not shown) that is conventionally located on the actuator arm 116. The readback signal, which carries both data and transducer position control information, is sent to the drive controller 125 for conventional processing. The controller 125 also generates write data and position control information during data write operations.

It will be appreciated that the foregoing detailed description of the disk drive 102 and the transducer 122 is exemplary in nature, and that many other design configurations would be possible while still incorporating a read head that has been fabricated according to the invention. For example, although not shown, the disk drive 102 will typically include a large number of disks and the actuator 112 will have several rigid actuator arms 116 carrying plural suspensions 118 and multiple sliders 120, each mounting its own transducer 122. Moreover, instead of using an air bearing slider, an alternative transducer carrying structure may be used that maintains the transducer 122 in contact or near contact with the disk 110.

Figure 7:
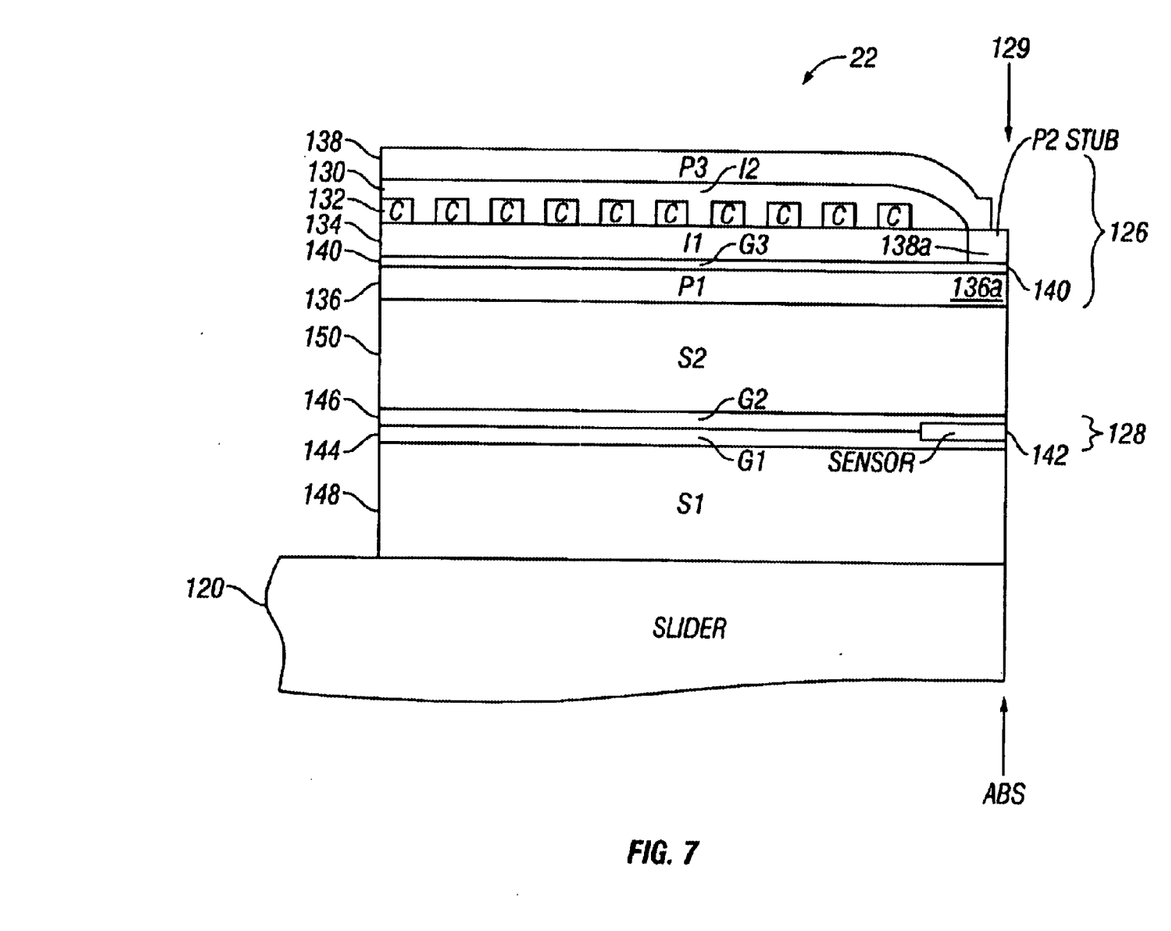
FIG. 7 is a vertical sectional view of an integrated read/write head that incorporates a magnetoresistive sensor according to the invention.
Figure 8:
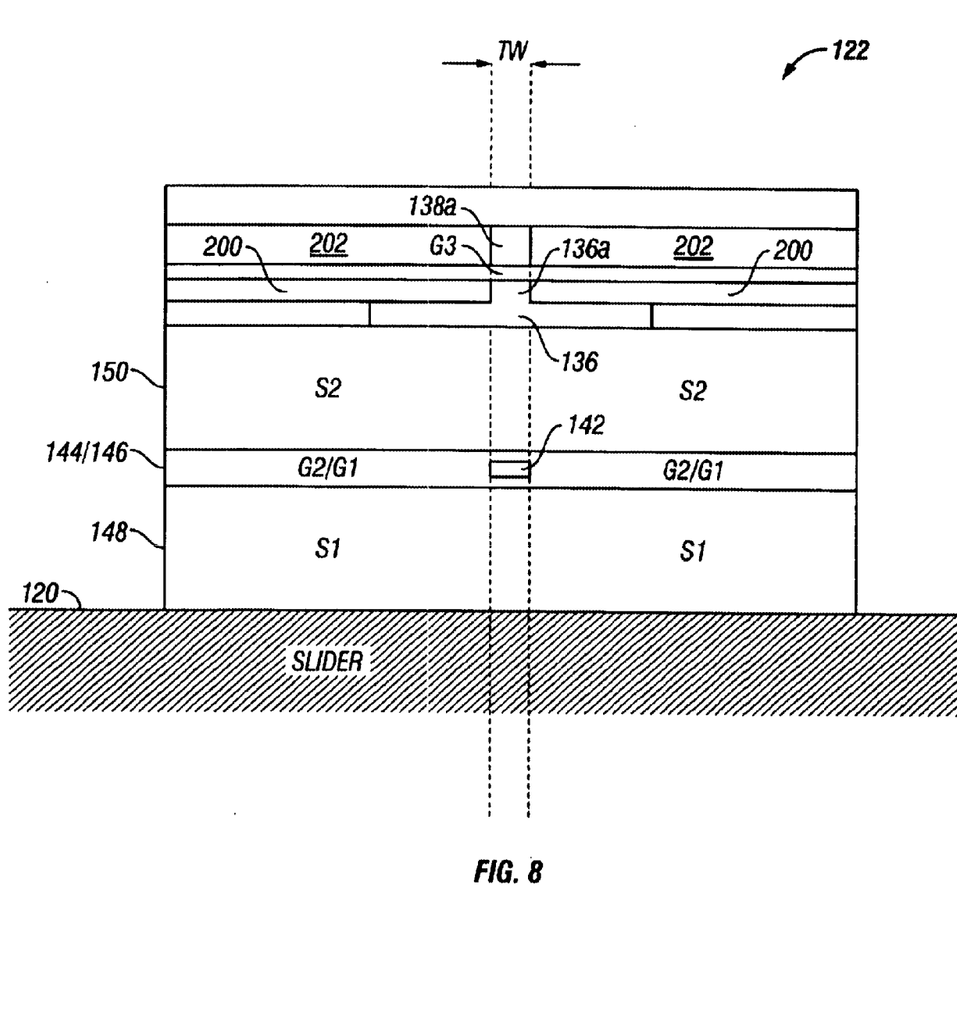
FIG. 8 is an ABS view of the integrated read/write head of FIG. 7.

Turning now to FIGS. 7 and 8, the write head portion of the transducer 122 is shown at 126 and the read head portion is shown at 128. The transducer 122 is shown in FIG. 7 as being lapped at 129 to form an ABS. The ABS 129 is spaced from the rotating disk 110 during drive operation by virtue of the above-described air bearing. FIG. 8 shows the transducer 122 from the vantage point of the ABS 129.

The write head 126 conventionally includes a combined layer comprising 12 insulative material 130 and plural inductive coil loops 132. The combined insulation and coil layer 130/132 is formed on an 11 insulation layer 134. The coils of the combined layer 130/132 inductively drive first and second pole pieces 136 and 138. A G3 gap layer 140 is sandwiched between the pole pieces 136 and 138 to provide a magnetic write gap at the pole tips 136a and 138a located adjacent to the ABS 129. Note that the pole piece 136 is commonly referred to as a "P1" pole piece and is labeled as such in FIG. 7. The pole piece 138 may either be referred to as a "P2" or "P3" pole piece depending on how the pole tip 138a is formed. If, as shown in FIG. 7, the pole tip 138a is formed separately from the pole piece 138, the pole piece 138 is referred to as a "P3" pole piece (and is labeled as such in FIG. 7) and the pole tip 138a is referred to as a "P2 stub" (as also shown in FIG. 7). If the pole tip 138a is formed with as part of the pole piece 138, the pole piece 138 is referred to as a "P2" pole piece. During a data write operation, signal current is conducted through the coils C of the combined layer 130/132, and flux is induced into the pole pieces 136 and 138. This flux fringes across the pole tips 136a and 138a at the ABS 129 and forms magnetic domains on the rotating disk 110. Note that the back gap portion of the write head 126 is not shown in FIG. 7.

The read head 28 of FIGS. 7 and 9 includes a thin film CPP read sensor 142 that is constructed according to the present invention and disposed in adjacent G1 and G2 gap areas 144 and 146. The G1 and G2 gap areas 144 and 146 are in turn sandwiched between a first (S1) magnetic shield layer 148 and second (S2) magnetic shield layer 150 that in some designs may also be used to provide the pole piece 136. The S1 shield layer 148 is conventionally formed over the slider 20, which is only partially shown in FIGS. 7 and 8 for clarity. During a read operation, magnetized domains on the concentric tracks of the rotating disk 110 inject flux into the read sensor 142. This influences the read sensor 142, causing a corresponding signal to be produced by the read sensor's sensing circuit (not shown).

FIG. 8 shows the face of the read sensor 142 as well as the pole tip portions 136a and 138a of the pole pieces 136 and 138. The track width feature size of the read sensor 142, the pole tip 136a and the pole tip 138a is defined by the dimension TW in FIG. 8. It will be seen that the pole piece 136 also includes a lower portion that extends beyond the track width dimension TW. This configuration is shown by way of example only and will not necessarily be found in other write heads made in accordance with the invention.

Accordingly, a CPP geometry spin valve sensor has been disclosed having an electrically conductive multilevel seed layer that improves magnetoresistance without impairing other important magnetic properties of the sensor, such as free layer coercivity ($H_c$), pinned-free layer magnetic coupling ($H_e$), and free layer magnetostriction ($\lambda$). While various embodiments of the invention have been described, it should be apparent that many variations and alternative embodiments could be implemented in accordance with the invention. It is understood, therefore, that the invention is not to be in any way limited except in accordance with the spirit of the appended claims and their equivalents.

What is claimed is:

1. A spin valve sensor adapted for current-perpendicular-to-plane operation for sensing magnetically recorded information on a data storage medium, said sensor comprising:
    a ferromagnetic free layer;
    a ferromagnetic pinned layer having a generally fixed magnetic moment;
    a nonmagnetic electrically conductive spacer layer sandwiched between said pinned layer and said free layer;
    an antiferromagnetic pinning layer exchange coupled on a first side thereof to said pinned layer for pinning the magnetic moment of said pinned layer; and
    an electrically conductive, multilevel seed layer interfacially engaging a second side of said antiferromagnetic pinning layer and adapted to promote the smooth growth of said antiferromagnetic pinning layer when said antiferromagnetic pinning layer is formed over said seed layer, and which increases said sensor's magnetoresistance while maintaining acceptable values of free layer coercivity, pinned-free layer magnetic coupling and free layer magnetostriction.

2. A spin valve sensor in accordance with claim 1 wherein said seed layer is applied on a bottom lead or shield of said sensor.

3. A spin valve sensor in accordance with claim 1 wherein said seed layer is applied via ion beam deposition on a bottom lead or shield of said sensor.

4. A spin valve sensor in accordance with claim 1 wherein said seed layer has a first seed layer portion of alternating sub-layers, said first seed layer portion having a thickness ranging between about 10–50 Å.

5. A spin valve sensor in accordance with claim 4 wherein said first seed layer portion comprises alternating Si and Ru sub-layers.

6. A spin valve sensor in accordance with claim 5 wherein said first seed layer portion comprises three Si layers and two Ru layers.

7. A spin valve sensor in accordance with claim 5 wherein said Si and Ru sub-layers are each about 6–8 Å thick.

8. A spin valve sensor in accordance with claim 1 wherein said seed layer comprises a first seed layer portion of alternating Ru and Si sub-layers and a second NiFeCr seed layer portion that interfacially engages said first seed layer portion and said antiferromagnetic pinning layer.

9. An integrated read/write head having a spin valve sensor adapted for current-perpendicular-to-plane operation for sensing magnetically recorded information on a data storage medium, said sensor comprising:
    a ferromagnetic free layer;
    a ferromagnetic pinned layer having a generally fixed magnetic moment;
    a nonmagnetic electrically conductive spacer layer sandwiched between and interfacially engaging said pinned layer and said free layer;
    an antiferromagnetic pinning layer exchange coupled on a first side thereof to said pinned layer for pinning the magnetic moment of said pinned layer; and
    an electrically conductive, multilevel seed layer interfacially engaging a second side of said antiferromagnetic pinning layer and adapted to promote the smooth growth of said antiferromagnetic pinning layer when said antiferromagnetic pinning layer is formed over said seed layer, and which increases said sensor's magnetoresistance while maintaining acceptable values of free layer coercivity, pinned-free layer magnetic coupling and free layer magnetostriction.

10. A read/write head in accordance with claim 9 wherein said seed layer is applied on a bottom lead or shield of said sensor.

11. A read/write head in accordance with claim 9 wherein said seed layer is applied via ion beam deposition on a bottom lead or shield of said sensor.

12. A read/write head in accordance with claim 9 wherein said seed layer has a first seed layer portion of alternating sub-layers, said first seed layer portion having a total thickness ranging between about 10–50 Å.

13. A read/write head in accordance with claim 12 wherein said first seed layer portion comprises alternating Si and Ru sub-layers.

14. A read/write head in accordance with claim 13 wherein said first seed layer portion comprises three Si layers and two Ru layers.

15. A read/write head in accordance with claim 13 wherein said Si and Ru sub-layers are each about 6–8 Å thick.

16. A read/write head in accordance with claim 9 wherein said seed layer comprises a first seed layer portion of alternating Si and Ru sub-layers and a second NiFeCr seed layer portion that interfacially engages said first seed layer portion and said antiferromagnetic pinning layer.

17. A disk drive, said disk drive having spin valve sensor adapted for current-perpendicular-to-plane operation for sensing magnetically recorded information on a data storage medium, said sensor comprising:

a ferromagnetic free layer;

a ferromagnetic pinned layer having a generally fixed magnetic moment;

a nonmagnetic electrically conductive spacer layer sandwiched between and interfacially engaging said pinned layer and said free layer;

an antiferromagnetic pinning layer exchange coupled on a first side thereof to said pinned layer for pinning the magnetic moment of said pinned layer; and an electrically conductive, multilevel seed layer interfacially engaging a second side of said antiferromagnetic pinning layer and adapted to promote the smooth growth of said antiferromagnetic pinning layer when said antiferromagnetic pinning layer is formed over said seed layer, and which increases said sensor's magnetoresistance while maintaining acceptable values of free layer coercivity, pinned-free layer magnetic coupling and free layer magnetostriction.

18. A disk drive in accordance with claim 17 wherein said seed layer is applied on a bottom lead or shield of said sensor.

19. A disk drive in accordance with claim 17 wherein said seed layer is applied via ion beam deposition on a bottom lead or shield of said sensor.

20. A disk drive in accordance with claim 17 wherein said seed layer has a first seed layer portion of alternating sub-layers, said first seed layer portion having a thickness ranging between about 10–50 Å.

21. A disk drive in accordance with claim 20 wherein said first seed layer portion comprises alternating Si and Ru sub-layers.

22. A disk drive in accordance with claim 21 wherein said seed layer portion comprises three Si layers and two Ru layers.

23. A disk drive in accordance with claim 21 wherein Si and Ru sub-layers are each about 6–8 Å thick.

24. A disk drive in accordance with claim 17 wherein said seed layer comprises a first seed layer portion of alternating Si and Ru sub-layers and a second NiFeCr seed layer portion that interfacially engages said first seed layer portion and said antiferromagnetic pinning layer.

* * * * *